United States Patent [19]
Rainer

[11] Patent Number: 5,595,652
[45] Date of Patent: *Jan. 21, 1997

[54] METHOD AND APPARATUS FOR IN-SITU REMEDIATION OF WATER CONTAINING UNDESIRABLE IONIC SPECIES

[76] Inventor: Norman B. Rainer, 2008 Fondulac Rd., Richmond, Va. 23229

[*] Notice: The term of this patent shall not extend beyond the expiration date of Pat. No. 5,597,850.

[21] Appl. No.: 307,422

[22] Filed: Sep. 19, 1994

Related U.S. Application Data

[63] Continuation-in-part of Ser. No. 561,006, Jul. 31, 1990.
[51] Int. Cl.⁶ .............................. B01D 27/02; B01J 8/06; B01J 39/04
[52] U.S. Cl. ................... 210/282; 210/287; 210/263; 210/681; 521/25; 521/29; 521/32
[58] Field of Search ............. 521/25, 29; 210/681, 210/282, 287

[56] References Cited

U.S. PATENT DOCUMENTS

| | | | |
|---|---|---|---|
| 3,580,891 | 5/1971 | Rainer | 521/25 |
| 3,715,339 | 2/1973 | Rainer | 521/25 |
| 4,332,916 | 6/1982 | Thill | 521/25 |
| 5,002,984 | 3/1991 | Rainer | 524/30 |
| 5,064,540 | 11/1991 | Rainer | 210/688 |
| 5,096,946 | 3/1992 | Rainer | 524/30 |
| 5,162,404 | 11/1992 | Rainer | 524/30 |
| 5,169,883 | 12/1992 | Rainer | 524/30 |
| 5,187,200 | 2/1993 | Rainer | 524/30 |

OTHER PUBLICATIONS

F. Helfferich, "Ion Exchange" (1962) 507–509 McGraw–Hill (New York).

*Primary Examiner*—Fred Zitomer
*Attorney, Agent, or Firm*—Norman B. Rainer

[57] ABSTRACT

Undesirable ionic species are removed from water by way of a passive treatment employing apparatus in the form of a porous container which confines a multitude of pieces of sponge containing a chelation polymer. The container, preferably of tubular shape and having a draw-string closure, is emplaced into a region through which water to be treated is caused to flow. The manner of emplacement is such as to prevent by-pass of water around the container. After a suitable time interval, the apparatus is removed and replaced with similar apparatus having fresh sponge.

6 Claims, 3 Drawing Sheets

5,595,652

METHOD AND APPARATUS FOR IN-SITU REMEDIATION OF WATER CONTAINING UNDESIRABLE IONIC SPECIES

RELATED APPLICATIONS

This Application is a continuation-in-part of U.S. patent application Ser. No. 07/561,006, filed 07/31/90.

BACKGROUND OF THE INVENTION

1. Field of the Invention

This invention concerns the treatment of water to remove therefrom inorganic ions, and more particularly relates to a method and apparatus for such treatment which permits an existing water flow at a given location to facilitate such treatment.

2. Description of the Prior Art

Water treatment installations for removing impurities from water are well known. For example, most cities or municipalities have a water purification plant wherein incoming water is treated by various filtration steps to remove suspended matter, and is eventually treated with a oxidizing agent such as chlorine or ozone which destroys dissolved organic species. A certain percentage of dissolved inorganic species become bound to the suspended matter which is removed by filtration. Larger amounts of dissolved metals can be removed by addition of compounds of iron or aluminum, which form a precipitate or floc structure capable of absorbing inorganic species. The precipitate or floc structure is then removed by filtration.

Such water purification installations involve considerable capital investment, and further involve high operational costs attributable to wages for operating personnel, chemicals, electricity, maintenance, and removal of sludges produced in the filtration steps. Such large water treatment facilities obviously are suitable only for municipalities or large industrial installations involving large daily volumes of water and where the high costs are affordable.

Many water pollution problems exist where the volume of water involved is so small or sporadic as not to justify remediation by way of costly facilities. Such low or sporadic flow situations are typical of ground water, storm water, landfill leachate and industrial effluents. In such situations, movement of water is generally resultant from gravity effect alone.

In many situations it is desired to selectively remove toxic inorganic ions present at small concentration amidst massive amounts of commonly abundant innocuous species. For example, in a typical groundwater situation, the water may contain great amounts of $Na^+$, $K^+$, $Ca^{++}$, $Mg^{++}$, $Al^{+++}$, $Cl^-$, and $SO_4^{--}$, which are all relatively harmless, and trace amounts of toxic species such as $Cd^{++}$, $Pb^{++}$, $Cr^{+++}$, $Hg^{++}$, $Ag^+$, $AsO_4^{-3}$ and $CrO_4^{-2}$. Prior methods for removing dissolved inorganic ions from water include: distillation, reverse osmosis, addition of precipitating ions followed by filtration, and ion exchange methods. All the aforesaid methods involve considerable capital investment and operational costs, and are not selective for toxic ions. The consequence of non-selectivity is that extensive costs are incurred in removing species that do not have to be removed.

The use of chelating resins is well known for the selective absorption of multi-valent transition heavy metals from aqueous solutions having large concentrations of other ions. However, such resins are generally manufactured in the form of spherical beads of 20–100 mesh size which must be confined within pressurized vessels. The beads present significant impedance to flow. Accordingly, the water to be treated must be pumped at high pressure through the bed of beads in the vessel. Because the chelating resins are of high cost, they must be regenerated for subsequent use. This requires specialized features of equipment and associated operating expenses. A further problem in employing a bed of small beads confined within a vessel is that, suspended matter in the ingoing water to be treated filters out within to the bed of beads to produce a clogging or binding effect that restricts further flow through the bed.

The desirability of so-called passive or in-situ water remediation techniques has received considerable attention in recent years. In such techniques, for example, groundwater would be treated without pumping it to the surface. Similarly, landfill leachates, storm water and industrial effluents would desirably be remediated in ways which would not require pumping or the intervention of equipment requiring operational personnel. A classic example of passive water remediation is the long known underground septic tank for microbial treatment of waste water effluent from residential buildings. Passive remediation systems are highly desirable at remote locations where there is no electricity and no operating personnel.

It is accordingly an object of the present invention to provide a passive water treatment method for removing dissolved inorganic ions.

It is a further object of this invention to provide a method as in the foregoing object which is substantially unaffected by the presence of suspended matter in the water undergoing treatment.

It is another object of the present invention to provide a method of the aforesaid nature wherein said inorganic ions are selectively removed from water having large quantities of other species.

It is a still further object of this invention to provide apparatus useful in carrying out the aforesaid process.

It is yet another object of the present invention to provide apparatus of the aforesaid nature which is easy to utilize, provides little impedance to flow, and is amenable to low cost manufacture.

These and other beneficial objects and advantages will be apparent from the following description.

SUMMARY OF THE INVENTION

The above and other beneficial objects and advantages are accomplished in accordance with the present invention by a method for removing ionic species from water comprising:
a) establishing a region through which said water will flow,
b) emplacing within said region a compliant porous bag in a manner whereby bypass around said bag within said region is prevented,
c) said bag containing a multitude of pieces of porous sponge containing a chelation polymer, the size of said sponge pieces being larger than the size of the pores of said bag, the average largest dimension of said pieces of sponge being in the range of 5 to 30 millimeters,
d) allowing said bag of sponge to remain in said region for an effective length of time to achieve absorption of ionic species,
e) removing said bag of sponge from said region, and
f) replacing said removed bag with a fresh bag of sponge.

The apparatus aspect of the present invention comprises a porous bag, and, confined within said bag, a multitude of pieces of porous sponge containing a chelation polymer, the size of said sponge pieces being larger than the pore size of said bag, the largest dimension of said pieces of sponge being in the range of 5 to 35 millimeters. The sponge pieces are preferably of uniform size and shape, and the sponge is preferably capable of expanding while undergoing transition from the dry state to a wet state.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
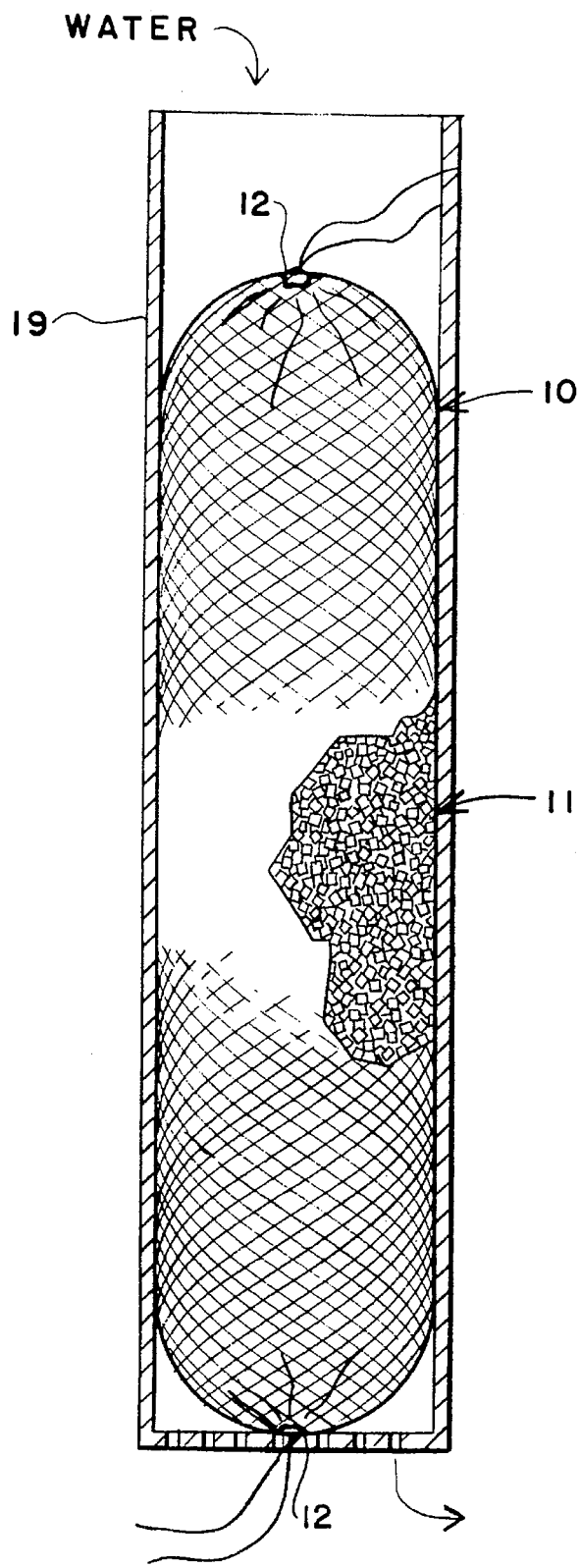
FIG. 1 is a side view of an embodiment of the bag apparatus of the present invention confined within a vertical pipe.
Figure 2:
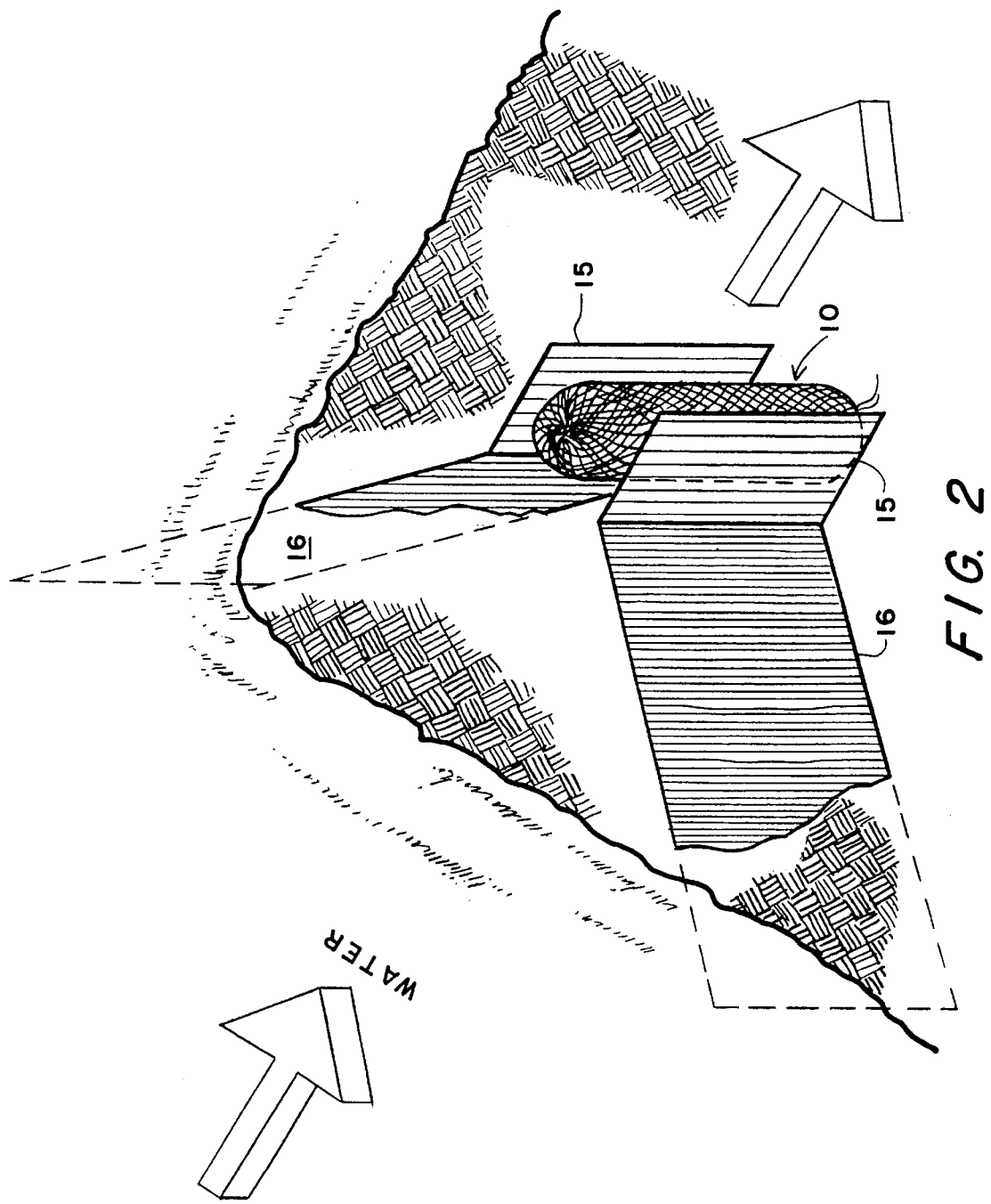
FIG. 2 illustrates a vertical emplacement of the bag within a region of ground water treatment fed by funnel-like barriers.
Figure 3:
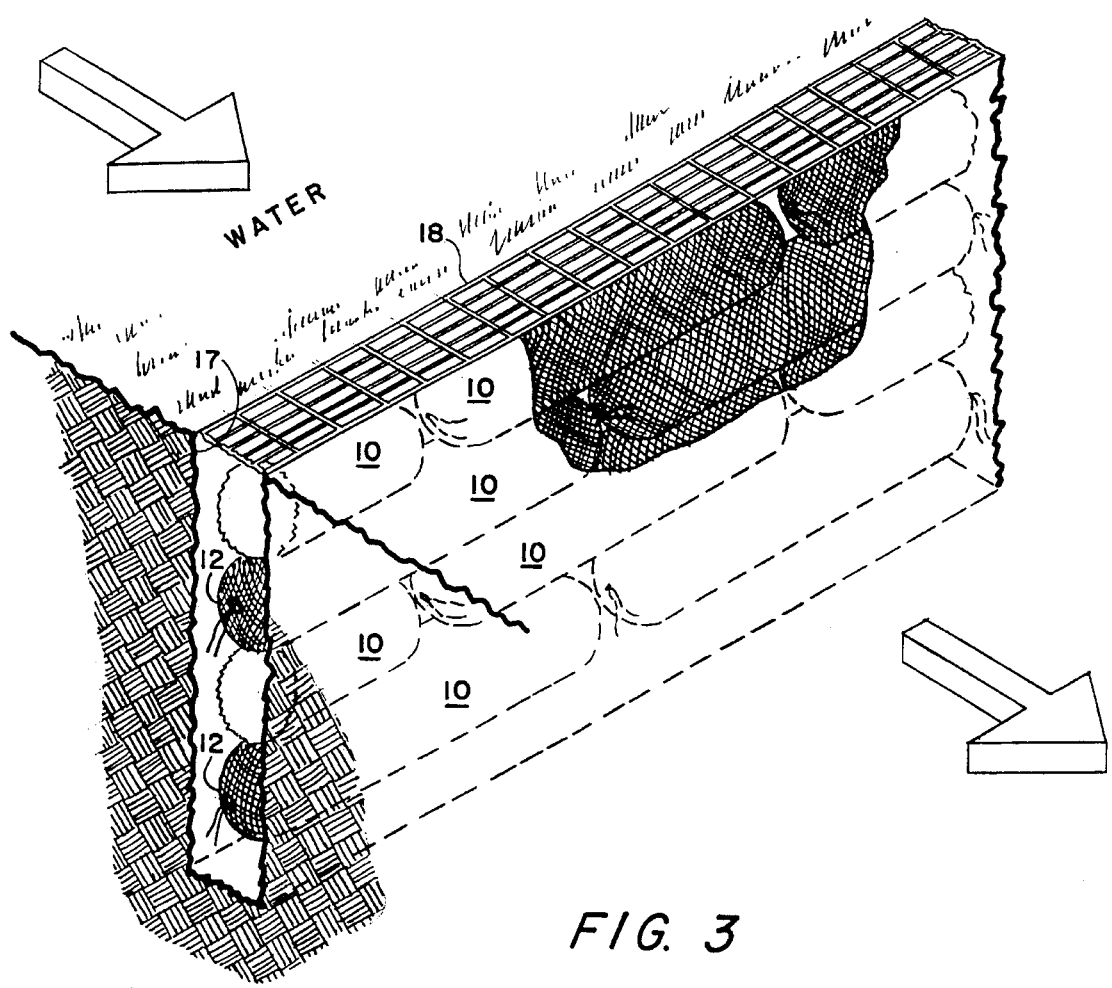
FIG. 3 illustrates horizontal emplacement of a number of bags in a ditch that intercedes groundwater flow.

Referring to FIGS. 1–3, an embodiment of the apparatus of this invention is shown comprised of compliant bag 10, and a multitude of pieces of sponge 11.

The bag is preferably of tubular shape, having closure means in the form of drawstrings 12 at both extremities, and is preferably fabricated of synthetic fiber material of considerable strength, such as polyamide or polyester. The reason the bag must be strong is that, during the manipulation steps of emplacing and removing bags, appreciably weight may be encountered. This is especially the case in removing a water-saturated bag of sponge, which may weight 50–200 lbs. Such manipulation is best achieved by gripping the bag by one of its extremities where the closure means is preferably a drawstring.

Preferred compliant tubular bags are such as to permit diametric expansion in the range of 5% to 20%. Ordinary square weave fabric structures generally do not permit the necessary diametric expansion. Preferable fabric constructions have a diamond-pattern netting structure. Suitable fabrics include nettings of polyester or polyamide. The mesh or pore size of said fabrics, namely the largest dimensions of the diamond-shaped spaces in the netting, may range from about ⅛" to ½". In employing said diamond-shaped netting fabrics, it is preferably that the fabric is aligned such that opposed apices of the diamond-shaped pattern are oriented in a direction parallel to the axis of the bag made from such fabric.

The region through which water will flow may, for example, be a circular culvert, a circular shaft vertically drilled into the ground, or a trench vertically formed in the ground.

The stretch characteristics of the bag are necessary to permit the bag and its sponge contents to completely fill said region of water flow in a manner whereby water is prevented from flowing through said region without flowing through said bag. For example, if the bag were non-stretching, it would need to have a diameter closely matching the geometry of the region of water flow. If the diameter closely matches the region of flow, it is difficult to insert the bag into the region of water treatment. If the bag is of smaller diameter so as to simplify its insertion into the region, the space between the bag and the wall structure defining the region would permit water to by-pass the bag by traveling adjacent said confining wall.

In a typical construction, the bag will be of tubular shape, having a sponge-filled diameter of about 8–12 inches and length between about 4 and 12 feet. Drawstring closures at one or both extremities of the bag facilitate filling and emptying of the bag. The closure further provides means for gripping and lifting of the filled bag. A bag of the aforesaid nature of 5 foot length and 8 inch diameter will confine about 22,000 to 25,000 pieces of sponge having a cubic size of 10 mm. When the sponge is in a dry state, the total weight of a bag of the aforesaid size and its sponge contents is about 14 pounds. Upon immersion in water, a considerable weight of water is absorbed by the sponge, and the bag plus its wet sponge content may then weigh about 100 pounds. It is preferred that the bag be lifted vertically by engagement of one of the closure extremities. In such manner of lifting, water disposed within the pores of the sponge and in the interstitial spaces between sponge pieces will rapidly drain off. Such action relieves the stress applied to the bag for lifting.

The preferred sponge to be employed in the practice of the present invention is an open celled cellulose sponge which contains 50%–75% by weight of a chelating polymer. The polymer does not occlude the pores of the sponge. The sponge, in a dry state, undergoes an expansion in size when it is immersed in water. The volumetric expansion is in the range of 1.3 to 5.0 times the size of the dry sponge. In a particularly preferred embodiment of this invention, the sponge pieces contained within the bag prior to use are in the dry or partially dry state. Once the bag of sponge is emplaced in the region of water treatment, the sponge and bag expands to tightly fill said region of treatment, whereby no by-pass of water is permitted. In some embodiments, it is preferred that the bag is not so filled with pieces of sponge as to produce a turgid structure. When some empty space exists in the bag, it is easier to emplace the bag into tight-fitting regions of treatment. In a further embodiment of the process of this invention, an empty bag can be positioned vertically within a region of treatment, and pieces of sponge can then be poured into the bag.

The pieces of sponge preferably have a cuboid shape defined by six surfaces, at least two of which are flat and parallel. A preferred cuboid shape is polyhedral, wherein all six surfaces are flat and disposed as three pairs of opposed flat surfaces. The pieces of sponge are best produced by cutting or stamping operations carried out upon a large sheet of sponge whose two opposed flat surfaces become the parallel surfaces of each piece of sponge. In stamping operations, severance in the direction transverse to the flat surfaces of the sheet can be achieved with non-straight die cutting members, thereby producing cuboid pieces of sponge having transverse boundary surfaces which, although non-flat are nevertheless projected surfaces produced by a fixed line moving in a straight path.

FIG. 1 illustrates an apparatus of this invention comprised of a tubular fabric bag 10 having end closures 12 and filled with sponge pieces 11. The bag is confined within impervious vertical pipe 19. FIG. 2 illustrates an embodiment of the process of this invention wherein the bag apparatus is emplaced vertically within a region of water treatment defined by opposed parallel walls 15 representing the neck portion of convergent in-ground impervious membrane walls 16. In such application, ground water from a wide area or plume is funnelled through the region of treatment. FIG. 3 illustrates an embodiment of the process of this invention wherein a multitude of the bags 10 are stacked in horizontal orientation within a region of treatment in the form of vertical ditch 17 which intercedes the natural flow of groundwater. A protective grate 18 covers ditch 17. In general, the region of water treatment is such as to constrain water to flow axially through the bag, as shown in FIG. 1, or transversely through the bag, a shown in FIGS. 2 and 3. In situations involving intermittent water flow, such as stormwater remediation, it is preferred that the water pass axially upward through the bag. This may be achieved by placing the bag in the downstream leg of a "plumber's elbow" conduit.

The duration of time during which the apparatus remains within the region of flow may range from a day to a month or more, and is dependent upon the rate at which the chelation polymer becomes saturated with absorbed ions. In general, high flow rates and high concentrations of absorbable species cause early saturation of the polymer. At saturation, the sponge will hold between about 5% and 25% of absorbed ions based upon the dry weight of the sponge.

Preferred chelation polymers useful in the practice of the present invention include polymers produced by the interaction of polyamines with polycarboxylic acids. Such polymers are disclosed in U.S. Pat. Nos. 5,169,883 and 5,096,946. Suitable polyamine components include polyethyleneimine and polyvinylamine. A preferred polycarboxylicacid component is nitrilotriacetic acid. The chelation polymer is preferably produced in-situ within a sponge matrix. The preferred sponge matrix is an open-celled sponge of regenerated cellulose.

A further understanding of my invention will be had from a consideration of the following example which illustrates a preferred embodiment. All parts and percentages are by weight unless otherwise indicated. It is understood that the instant invention is not to be construed as being limited by said example or by the details therein.

EXAMPLE 1

Pursuant to Example 1 of U.S. patent application Ser. No. 07/561,006, filed 07/31/90, 7.5 parts of nitrilotriacetic acid were mixed with 6.0 parts polyethyleneimine having a molecular weight of about 1800, and 19 parts deionized water at 50 degrees C to produce a homogeneous precursor solution having a pH of 6.8.

Individual pieces of open celled sponge of regenerated cellulose having a cubic centimeter configuration were saturated with the precursor solution and then squeezed between rollers to produce a damp sponge having about 216% add-on of precursor solution. The damp sponge was then heated at 155 degrees C. for 55 minutes. The resultant sponge was washed with water, dried at 110 degrees C., and allowed to equilibrate in a conditioning chamber at 24 degrees C. and 60% relative humidity. The final dimensions of the sponge are substantially the same as the dimensions of the sponge prior to treatment. The sponge contains about 52% by weight of polymer, and the average weight of a cube of sponge is 230 milligrams.

A tubular container was fabricated of ¼" diamond mesh polyester, the container having a length of 67 inches and a folded flat width of 14 inches, corresponding to a tubular diameter of 28 inches. Drawstrings were installed at both extremities of the container. The container was filled with the sponge prepared as above. When filled, it was found that 13 pounds of sponge were held by the container. By calculation, there are accordingly about 24,000 cubes of sponge in the container.

The sponge-filled container was lowered into a vertical shaft in the ground, said shaft being lined by perforated PVC sewer pipe of 8" inside diameter. The depth to which the container was lowered was sufficient to become engulfed by groundwater. The sponge rapidly expanded to cause the container to tightly fit against the pipe. The groundwater contained 7800 ppm $Na^+$, 310 ppm $Ca^{++}$, 230 ppm $Al^{+++}$, 115 ppm $K^+$, 8120 ppm $Cl^-$, about 1 ppm each of the toxic species: $Pb^{++}$, $Cd^{++}$, and $Cu^{++}$, and other ions. The flow rate laterally across the perforated sewer pipe was about 3 gallons per minute.

The container was left in place for 11 days, then vertically lifted out of the pipe. The sponge cubes were dried, and random samples were taken for analysis for metals content. It was found that the sponge contained 3.3% Cu, 3.1% Pb and 2.9% Cd. This represents the selective removal of over one pound of toxic metals from groundwater which contains massive quantities of innocuous species.

The sponge was found to be re-useable in this application following an elution treatment with 10% $HNO_3$ and a rinse with water. The overall treatment of the groundwater accordingly involves essentially no capital investment and little operational cost.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for the selective removal of dissolved multivalent metal ions from water comprising a compliant porous container of tubular shape having closure means associated with at least one extremity and, confined within said container, a multitude of pieces of porous sponge of cuboid configuration defined by six surfaces and containing 50% to 75% by weight of a chelation polymer, the average size of said sponge pieces being larger than the pore size of said container, the largest average dimension of said pieces of sponge being in the range of 5 to 30 millimeters when dry, said container permitting diametric expansion under the influence of said confined pieces of sponge.

2. The apparatus of claim 1 wherein the pieces of sponge in said container are of substantially uniform size and shape.

3. The apparatus of claim 1 wherein said container permits a diametric expansion of between 5% and 20%.

4. The apparatus of claim 1 wherein said pieces of sponge, in dry form, undergo a 1.3 to 5.0 fold expansion in volume when soaked in water.

5. The apparatus of claim 1 wherein said container is fabricated of an open mesh netting fabric having a mesh size between ⅛" and ½".

6. The apparatus of claim 1 wherein said container includes some empty space, whereby it is not so filled with pieces of sponge as to produce a turgid structure.

* * * * *